US012578887B2

(12) United States Patent
Majerus et al.

(10) Patent No.: US 12,578,887 B2
(45) Date of Patent: Mar. 17, 2026

(54) BOOT PROCESS TO IMPROVE DATA RETENTION IN MEMORY DEVICES

(71) Applicant: Micron Technology, Inc., Boise, ID (US)

(72) Inventors: Douglas Eugene Majerus, Boise, ID (US); Cheng Long Ben, Shanghai (CN); Qisong Lin, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/783,121

(22) Filed: Jul. 24, 2024

(65) Prior Publication Data

US 2025/0085876 A1      Mar. 13, 2025

Related U.S. Application Data

(60) Provisional application No. 63/537,075, filed on Sep. 7, 2023.

(51) Int. Cl.
*G06F 3/06* (2006.01)

(52) U.S. Cl.
CPC .......... *G06F 3/0632* (2013.01); *G06F 3/0604* (2013.01); *G06F 3/0659* (2013.01); *G06F 3/0679* (2013.01)

(58) Field of Classification Search
CPC .... G06F 3/0632; G06F 3/0604; G06F 3/0659; G06F 3/0679; G06F 11/14; G06F 11/1417
See application file for complete search history.

(56) References Cited

U.S. PATENT DOCUMENTS

| | | | | |
|---|---|---|---|---|
| 6,490,677 | B1 * | 12/2002 | Aguilar ................. | G06F 9/4416 |
| | | | | 713/1 |
| 11,500,637 | B2 | 11/2022 | Stoller et al. | |
| 2005/0160217 | A1 * | 7/2005 | Gonzalez ........... | G06F 11/1068 |
| | | | | 714/E11.038 |
| 2007/0226478 | A1 * | 9/2007 | Rudelic .............. | G06F 12/1408 |
| | | | | 713/1 |
| 2014/0365823 | A1 * | 12/2014 | Michihata ........... | G06F 11/1417 |
| | | | | 714/16 |
| 2019/0339888 | A1 * | 11/2019 | Sasidharan .......... | G06F 3/0679 |
| 2021/0089229 | A1 | 3/2021 | Majerus et al. | |
| 2021/0208900 | A1 * | 7/2021 | Pamoti ................ | G06F 11/1417 |
| 2021/0247986 | A1 * | 8/2021 | Lai ........................ | G06F 9/4401 |
| 2021/0326066 | A1 * | 10/2021 | Bommana ............. | G06F 3/0634 |
| 2023/0351055 | A1 * | 11/2023 | Lai ........................ | H04L 9/0618 |

* cited by examiner

*Primary Examiner* — Tracy A Warren
(74) *Attorney, Agent, or Firm* — Schwegman Lundberg & Woessner, P.A.

(57) ABSTRACT

A memory device includes a boot block that stores boot block code encoded using an encoding scheme. The boot block code includes a set of machine-readable instructions for booting the memory sub-system. A read command directed at the boot block is received while the memory device is in a boot state. Based on the command, the encoded boot block code is read from the boot block and decoded based on the encoding scheme. The decoded boot block code is provided to a memory sub-system controller responsive to the command

20 Claims, 7 Drawing Sheets

300

305
RECEIVE READ COMMAND DIRECTED AT BOOT BLOCK

310
READ ENCODED BOOT BLOCK CODE FROM BOOT BLOCK

315
DECODE ENCODED BOOT BLOCK CODE

320
PROVIDE DECODED BOOT BLOCK CODE RESPONSIVE TO READ COMMAND

300

305

310    READ ENCODED BOOT BLOCK CODE FROM BOOT BLOCK

505    PERFORM FIRST READ OPERATION

510    DETERMINE FIRST READ OPERATION IS UNSUCESSFUL

515    PERFORM SECOND READ OPERATION

315

320

305

310

315

320

605 — DETECT SUCESSFUL BOOTING OF MEMORY SUB-SYSTEM

610 — PLACE MEMORY DEVICE IN NORMAL OPERATION STATE

BOOT PROCESS TO IMPROVE DATA RETENTION IN MEMORY DEVICES

PRIORITY APPLICATION

This application claims the benefit of priority to U.S. Provisional Application Ser. No. 63/537,075, filed Sep. 7, 2023, which is incorporated herein by reference in its entirety.

TECHNICAL FIELD

Embodiments of the disclosure relate generally to memory sub-systems and more specifically to a boot process for improving data retention in memory sub-devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
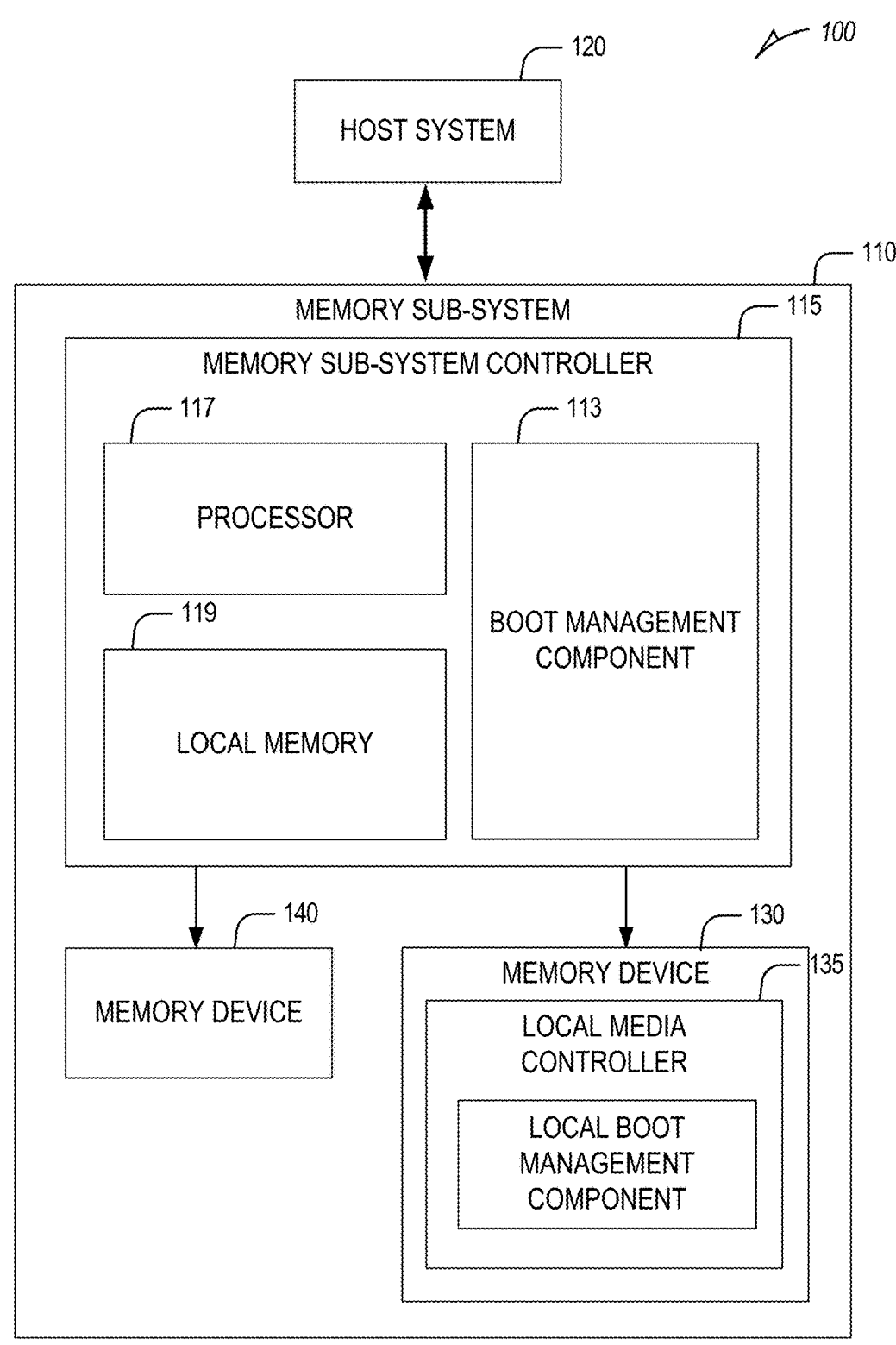
FIG. 1 is a diagram illustrating an example computing system that includes a memory sub-system, in accordance with some embodiments of the present disclosure.

Aspects of the present disclosure are directed to an approach to managing a memory sub-system boot process that improves data retention in memory devices. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A memory device can be a non-volatile memory device. One example of non-volatile memory devices is a negative-and (NAND) memory device. Other examples of non-volatile memory devices are described below in conjunction with FIG. 1. A NAND memory device can include multiple NAND dies. Each die may include one or more planes and each plane includes multiple blocks. Each block includes an array that includes pages (rows) and strings (columns). A string includes a plurality of memory cells connected in series. A memory cell ("cell") is an electronic circuit that stores information. Depending on the cell type, a cell can store one or more bits of binary information and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a block. Data can be written to a block, page-by-page. Data can be erased at a block level. However, portions of a block cannot be erased.

Some types of memory devices such as NAND memory devices include a boot block that stores information to initialize memory sub-system components with all appropriate settings during a boot process. During the boot process, the memory device is not under full control of the memory sub-system controller. Instead, an application-specific integrated circuit (ASIC) is generally responsible for controlling the memory device during the boot process. Thus, during the boot process, the functionality of the memory sub-system, generally, and the memory device, specifically, is limited. For example, during the boot process, extensive read retry or advanced error handling operations such as read level calibration or probabilistic decoding operations are not supported in conventional memory sub-systems. As a result, several redundant copies of the boot information are stored on the memory device to make sure that if a first copy of the information is inaccessible, a second copy would be accessible. However, error handling during the boot process is typically very limited.

Common engineering quality standards require certain data retention capability for memory devices, especially when deployed in certain situations. For example, engineering quality standards may require data retention for 5 years at 40° Celsius. Without robust data retention capability, memory devices stored in a power off state at high temperatures could become unusable.

For NAND memory devices, a dominant data retention mechanism is charge loss. This mechanism is common across all the stored copies of the boot information in the memory sub-system, which makes the redundancy less effective. Exposure to time at high temperature can create significant stress and can cause enough charge loss that without advanced correction capabilities, the read levels could be driven lower than the available recovery options and potentially cause failure across all available copies of the boot information, which is referred to as "common mode" degradation. In these cases, the multiple copies of the boot information do not provide the same level of protection as expected for other failure behavior such as random failure processes.

Aspects of the present disclosure address the forgoing memory device data reliability issues during the boot process with a memory sub-system that utilizes encoding and decoding functionality of memory devices for boot information during the boot process. Boot information (e.g., ASIC initialization instructions) stored by a memory device is encoded using a high reliability secondary encoding scheme supported by the memory device. As an example, the high reliability secondary encoding scheme can include using multiple copies for redundancy, arranging data to be resistant to common failure mechanisms, and using additional spare bits to increase correction ability.

In an example, encoded boot block code is written by a host system to a boot block of a memory device. The boot block code is encoded using a high reliability encoding format supported by the memory device. A read command directed at the boot block is received while the memory device is in a boot state. While in the boot state, the memory device is configured to perform functionality to improve data reliability that is disabled once the memory device is transitioned to a normal operation state. For example, based on receiving the command while in the boot state, the memory device determines a read location (e.g., a page in the boot block) for the boot block code based on the command (e.g., based on a predefined page offset or a stored page map), reads the encoded boot block code from the boot block, decodes the boot block code, and provides the boot block code to a memory sub-system controller, which in turn enables the memory device to boot and enables full error correction capability for the memory device. Upon detecting successful booting of the memory sub-system, the memory device transitions from the boot state to a normal operation system, which disables boot process features including the decoding functionality of the memory device during read operations.

In addition to the utilization of the decoding functionality during the boot process, in some embodiments, the memory device may perform additional functions during the boot process to improve data reliability. For example, for some embodiments, the memory device may utilize modified read levels (relative to default read levels used during normal operation) in performing read operations on the boot block during the boot process. As another example, the memory device may perform one or more read retries in which a read operation is reattempted using different read parameters (e.g., modified read levels) than were used for an initial unsuccessful read operation (e.g., based on data read from the boot block including too many uncorrectable ECC errors). Such features may also be disabled upon transitioning the memory device to the normal operation state.

This approach to memory sub-system booting improves the data retention capabilities for NAND memory devices (among others) where advanced error handing and recovery features are not available while also meeting industry standards for data retention capability.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional cross-point (3D cross-point) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 130 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controllers 135 that operate in conjunction with memory sub-system controller 115 to execute operations on one or more memory cells of the memory devices 130.

The memory sub-system 110 also includes a boot management component 113 that is responsible for managing aspects of a boot process for the memory sub-system 110. As an example, during the boot process, the boot management component 113 processes read commands for stored boot information (e.g., stored by one or more of the memory devices 130 or 140) used to initialize one or more components of the memory sub-system 110 such as the memory devices 130 and 140.

In processing read commands for boot information, the boot management component 113 works in conjunction with a local boot management component 145 of the local media controller 135 of the memory device 130 (also commonly referred to as a "boot loader"). For example, the memory device 130 may include a boot block that stores encoded boot information, and while the memory device 130 is in a boot state, a read command directed at the boot block may be received (e.g., from the host system 120) by the boot management component 113. The boot management component 113 sends a command (or other signal) to the local boot management component 145 for the boot information. The local boot management component 145, in turn, reads the encoded boot information from the boot block, decodes the boot information, and provides the decoded boot information to the boot management component 113, which in turn provides the boot information to the memory sub-system controller 115 for use in initializing one or more components of the memory sub-system 110.

In some embodiments, the memory sub-system controller 115 includes at least a portion of the boot management component 113. For example, the memory sub-system controller 115 can include an ASIC corresponding to the boot management component 113. As another example, the memory sub-system controller 115 can include a processor 117 (processing device) configured to execute instructions stored in local memory 119 for performing the operations described herein. In some embodiments, the boot management component 113 is part of the host system 120, an application, or an operating system. In some embodiments, the local media controller 135 includes at least a portion of the boot management component 113.

Figure 2:
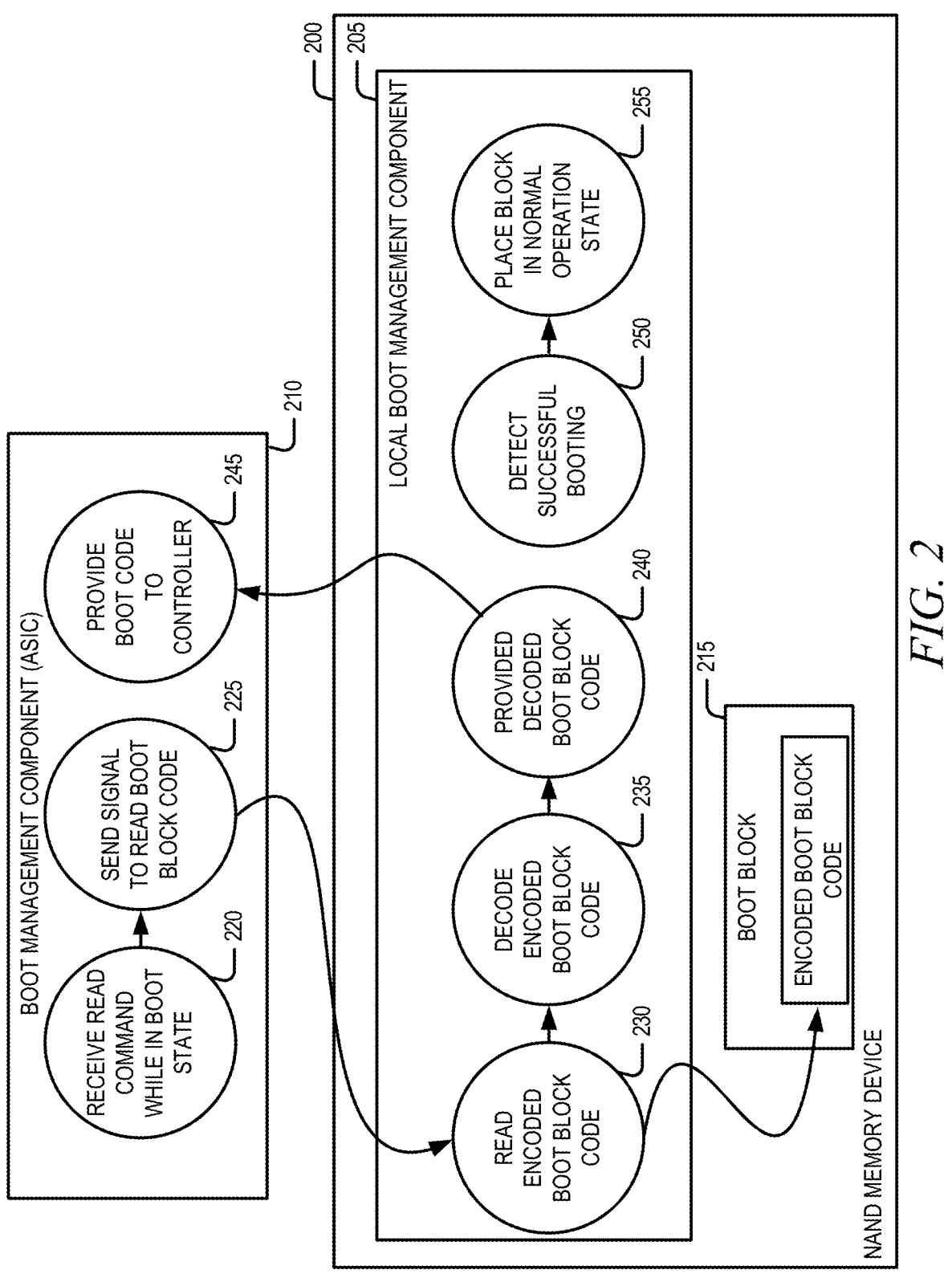
FIG. 2 is a diagram illustrating example interactions between components of a memory sub-system in managing a boot process of the memory sub-system, in accordance with some embodiments of the present disclosure.

FIG. 2 is a conceptual diagram illustrating example interactions between components of a memory sub-system during a booting process, in accordance with some embodiments of the present disclosure. In the example illustrated in FIG. 2, the memory device 130 of FIG. 1 is in the example form of a NAND memory device 200 that includes a local boot management component 205, which is an example of the local boot management component 145. In addition, in the example illustrated in FIG. 2, the boot management component 113 is in the example form of an ASIC 210.

The NAND memory device 200 includes multiple NAND dies; each die may include one or more planes, each of which includes multiple blocks. Each block includes a 2D or 3D array that includes pages (rows) and strings (columns). A string includes a plurality of memory cells connected in series. Each memory cell is used to represent one or more bit values. Each cell includes a transistor, and within each cell, data is stored as the threshold voltage of the transistor.

A single NAND flash cell includes a transistor that stores an electric charge on a memory layer that is isolated by oxide insulating layers above and below. Within each cell, data is stored as the threshold voltage of the transistor. SLC NAND, for example, can store one bit per cell. Other types of memory cells, such as MLCs, TLCs, QLCs, and PLCs, can store multiple bits per cell. Strings are connected within a NAND block to allow storage and retrieval of data from selected cells. NAND cells in the same column are connected in series to form a bit line (BL). All cells in a bit line are connected to a common ground on one end and a commonsense amplifier on the other for reading the threshold voltage of one of the cells when decoding data. NAND cells are connected horizontally at their control gates to a word line (WL) to form a page. In MLC, TLC, QLC, and PLC NAND, a page is a set of connected cells that share the same word line and is the minimum unit to program.

As noted above, each NAND cell stores data in the form of the threshold voltage (VT) of the transistor. The range of threshold voltages of a memory cell can be divided into a number of regions based on the number of bits stored by the cell where each region corresponds to a value that can be represented by the cell. More specifically, each region corresponds to a charge level (also referred to herein as "read level") and each charge level decodes into a multi-bit value. For example, a TLC NAND flash cell can be at one of eight charge levels: L0, L1, L2, L3, L4, L5, L6, or L7. Each charge level decodes into a 3-bit value that is stored in the flash cell (e.g., 111, 110, 100, 000, 010, 011, 001, and 101).

During write operations, data is programmed into a block of the memory device 130 using a programming sequence that includes multiple passes in which programming pulses are applied to cells in the block. Over the multiple passes, the programming pulses configure the threshold voltages of the cells in each page according to the value the cells are intended to represent. As the programming sequence progresses, the voltage level of the programming pulses increase until a target voltage level for each cell (also referred to as "write level" herein) is reached.

As shown, the NAND memory device 200 includes a boot block 215 that stores boot block code that can be used in booting one or more components of the memory sub-system 110 (e.g., the NAND memory device 200). The boot block 215 corresponds to a memory location that is guaranteed good and is at an industry convention location for NAND (e.g., block 0, page 0), to guide the boot process. The boot block code stored by the boot block 215 comprises a set of computer-readable instructions (e.g., firmware) to configure the memory sub-system controller 115 to perform one or more functions. The boot block code stored by the boot block 215 is encoded. The boot block code may be encoded using a high reliability secondary encoding scheme. As an example, the high reliability secondary encoding scheme can include using multiple copies for redundancy where half of the copies are bit inverted to detect and correct common mode charge loss. In addition, the encoding scheme may include arranging data to be resistant to common failure mechanisms, and using higher levels of encoding (e.g., Low-Density Parity Check (LDPC) or Bose-Chaudhuri-Hocquenghem (BCH) additional spare bits) to increase correction ability.

The boot block code may be provided by the host system 120. For example, the host system 120 may provide the boot block code as part of a write command directed at the boot block 215. In some embodiments, the host system 120 encodes the boot block code before it is written to the boot block 215. In some embodiments, an encoder of the local boot management component 205 (not shown) encodes the boot block code before it is written to the boot block 215.

For some embodiments, modified write levels are used in writing the encoded boot block code to the boot block 215. That is, write levels used in writing the boot block code to the boot block 215 can be modified relative to default write levels used during normal operations. For example, one or more write levels may be increased when writing the boot block code to the boot block 215.

At system power-up, the NAND memory device 200 is initialized in a boot state. While in the boot state, the NAND memory device 200 is configured to perform functionality to improve data reliability that is disabled once the device is transitioned to a normal operation state.

While the NAND memory device 200 is in the boot state, a read command to read the boot block code from the boot block 215 is received by the memory sub-system 110 (e.g., by the ASIC 210) from the host system 120, at operation 220.

Based on the read command received from the host system 120, the ASIC 210 sends a signal (e.g., a command) to the local boot management component 205 to provide the boot block code, at operation 225. In return, the local boot management component 205 reads the encoded boot block code from the boot block 215 of the NAND memory device 200, at operation 230.

The local boot management component 205 can determine a read location within the boot block 215 (e.g., a page within the boot block 215) based on an address specified by the read command received from the host system 120. For some embodiments, the address specified by the command maps directly to the read location. For some examples, a predefined page offset is used and the local boot management component 205 determines the read location based on the predefined page offset. For some examples, a mapping between addresses and read locations in the boot block 215 (e.g., a mapping between logical addresses and physical addresses corresponding to pages in the boot block 215) is used to determine the read location. The mapping may be stored at the same location as the boot block code or in another location within the NAND memory device 200. For example, the mapping may be stored in the boot block 215 or another block of the NAND memory device 200. In some examples, translation between addresses and read locations may be performed internally by the NAND memory device 200.

A decoder of the local boot management component 205 (not shown) decodes the encoded boot block code, at operation 235, based on the NAND memory device 200 being in the boot state. The local boot management component 205 provides the decoded boot block code to the ASIC 210 (operation 240) and the ASIC 210 in turn provides the boot block code to the memory sub-system controller 115 for use in booting one or more components of the memory sub-system 110 (operation 245).

For some embodiments, the local boot management component 205, while in the boot state, uses one or more modified read levels (relative to default read levels) in reading the boot block code from the boot block 215.

For some embodiments, the local boot management component 205, while in the boot state, may perform one or more read-retries in reading the boot block code from the boot block 215. For example, the local boot management component 205 may perform a first read operation at the boot block 215 based on a first set of read parameters, and based on determining the first read operation is unsuccessful (e.g., based on uncorrectable ECC errors in the data read from the boot block 215), the local boot management component 205 may perform a second read operation based on a second set of read parameters where the second set of read parameters is based on one or more adjustments to the first set of read parameters. The read parameters may, for example, specify one or more read levels, and thus the second set of read parameters may include one or more modified (e.g., decreased) read levels compared to the first set of read parameters.

Upon detecting successful booting of the memory sub-system 110 (at operation 250), the local boot management component 205 places the NAND memory device 200 in a normal operation state (at operation 255). That is, the local boot management component 205 causes the NAND memory device 200 to transition from the boot state to the normal operation state. In doing so, one or more functions of the local boot management component 205 performed while the NAND memory device 200 is in the boot state are disabled (e.g., encoding/decoding, increase read levels, read retries).

For some embodiments, the local boot management component 205 may detect the successful booting of the memory sub-system 110 based on detecting an adjustment to one or more settings of the memory sub-system 110. For example, one or more settings of the NAND memory device 200 may be modified to default or expected settings as part of proper booting of the memory sub-system 110.

For some embodiments, the local boot management component 205 detects successful booting of the memory sub-system 110 based on a detecting a change to bus speed (e.g., a change to an Open Flash Interface (ONFI) utilized by the memory device 200 to communicate with other components of the memory sub-system 110).

For some embodiments, the local boot management component 205 detects the successful booting of the memory sub-system 110 based on a command or other information received from the controller 115 of the memory sub-system 110. For example, the controller 115 may issue a command to the local media controller 135 that indicates successful booting of the memory sub-system 110.

Figure 3:
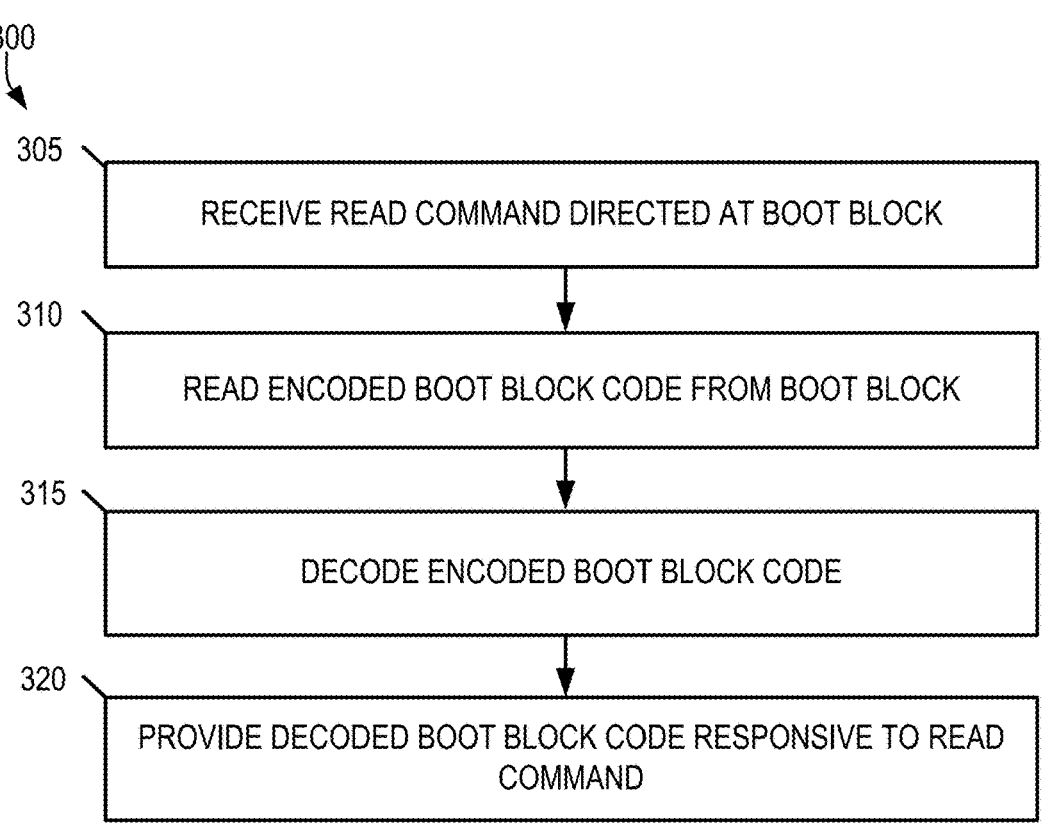
FIG. 3-6 are flowcharts illustrating an example method for managing a boot process of the memory sub-system, in accordance with some embodiments of the present disclosure.

FIG. 3 is a flow diagram illustrating an example method 300 for booting a memory sub-system, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the boot management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device receives a read command directed to a boot block of a memory device in a memory sub-system while the memory device is in a boot state. In some examples, the memory device is a NAND memory device and the boot block is implemented within the NAND device. In some examples, the processing device receives the read command from a host system. In some examples, the processing device receives the command from a boot management component based on a command received from a host system. As noted above, the boot management component may be, include, or correspond to an ASIC.

The boot block stores boot block code (e.g., ASIC initialization code) used in booting a memory sub-system. That is, the boot block code includes a set of machine-readable instructions for booting one or more components of the memory sub-system (e.g., a memory sub-system controller). For example, the boot block code may include or correspond to firmware for a memory sub-system controller.

The boot block code stored by the boot block is encoded. The boot block code may be encoded using a high reliability secondary encoding scheme that is transparent to the boot management component.

For some embodiments, an encoder of the memory devices encodes the boot block code in response to a command from a host system to write the boot block code to the boot block. For some embodiments, the host system provides the encoded boot block code as part of a command to write the encoded boot block code to the boot block.

For some embodiments, modified write levels are used in writing the encoded boot block code to the boot block. That is, write levels used in writing the boot block code to the boot block may be modified relative to default write levels used during normal operations to increase reliability. For example, one or more write levels may be increased when writing the boot block code to the boot block. The modified write levels can also work in conjunction with specific read path modification to improve robustness.

At operation 310, the processing device reads the encoded boot block code from the boot block. For some embodiments, while in the boot state, the processing device uses modified (e.g., increased) read levels compared to a default read level used during normal operation. Consistent with these embodiments, the processing device may utilize the modified read levels by default while the memory device is in the boot state or the processing device may adjust the read levels in response to receiving the read command directed at the boot block.

The processing device decodes the encoded boot block code, at operation 315. For example, depending on the embodiment, the processing device may include a decoder to decode the boot block code.

The processing device, at operation 320, provides the decoded boot block code responsive to the command. For some embodiments, the processing device provides the decoded boot code to a memory sub-system controller for use in booting one or more components of the memory sub-system. For example, the memory sub-system controller may use the boot block code to initialize the memory device with appropriate settings.

Figure 4:
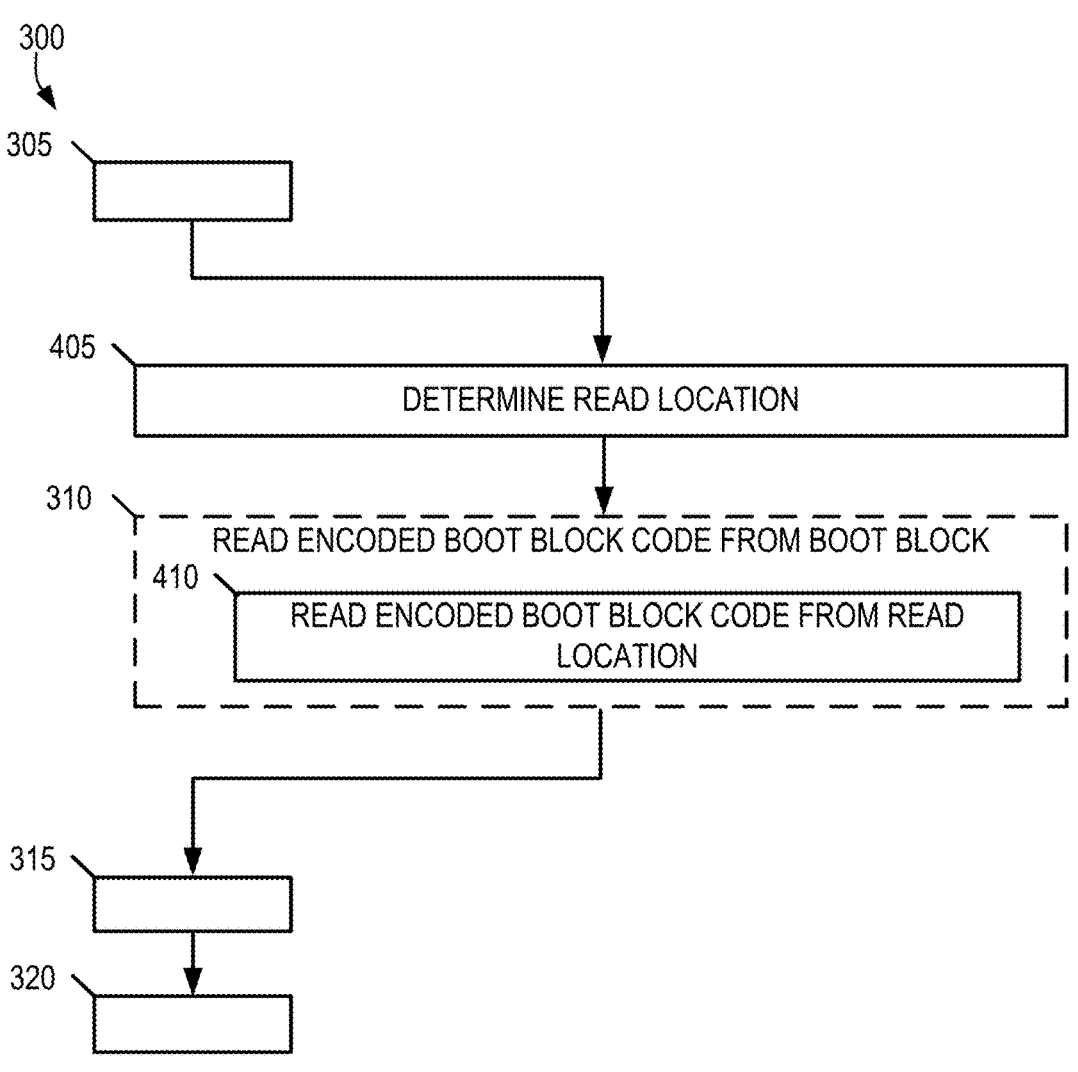

As shown in FIG. 4, the method 300 may, in some embodiments, include the operations 405 and 410. Consistent with these embodiments, the operation 405 may be performed prior to operation 310 where the processing device reads the encoded boot block code from the boot block. Consistent with these embodiments, the command specifies an address (e.g., a logical address) associated with a read location in the boot block. The address may, for example, corresponds to a page within the boot block from which the boot block code is to be read.

At operation 405, the processing device determines the read location (e.g., the page from which the boot block code is to be read) based on the address specified in the command. For some embodiments, the processing device determines the read location based on a predetermined page offset. In an example, the command specifies a first address, and the processing device determines a second address corresponding to the read location based on the page offset.

For some examples, the processing device determines the read location based on a predefined mapping between addresses and physical locations (e.g., a mapping between addresses and pages within the memory device) within the memory device (or specifically within the boot block of the memory device). The predefined mapping may be stored at a predefined location within the memory device such as another location (e.g., another page) within the boot block.

Consistent with these embodiments, the operation 410 may be performed as part of the operation 310 where the processing device reads the encoded boot block code from the boot block. At operation 410, the processing device reads the encoded boot block code from the read location determined based on the address specified in the command.

Figure 5:
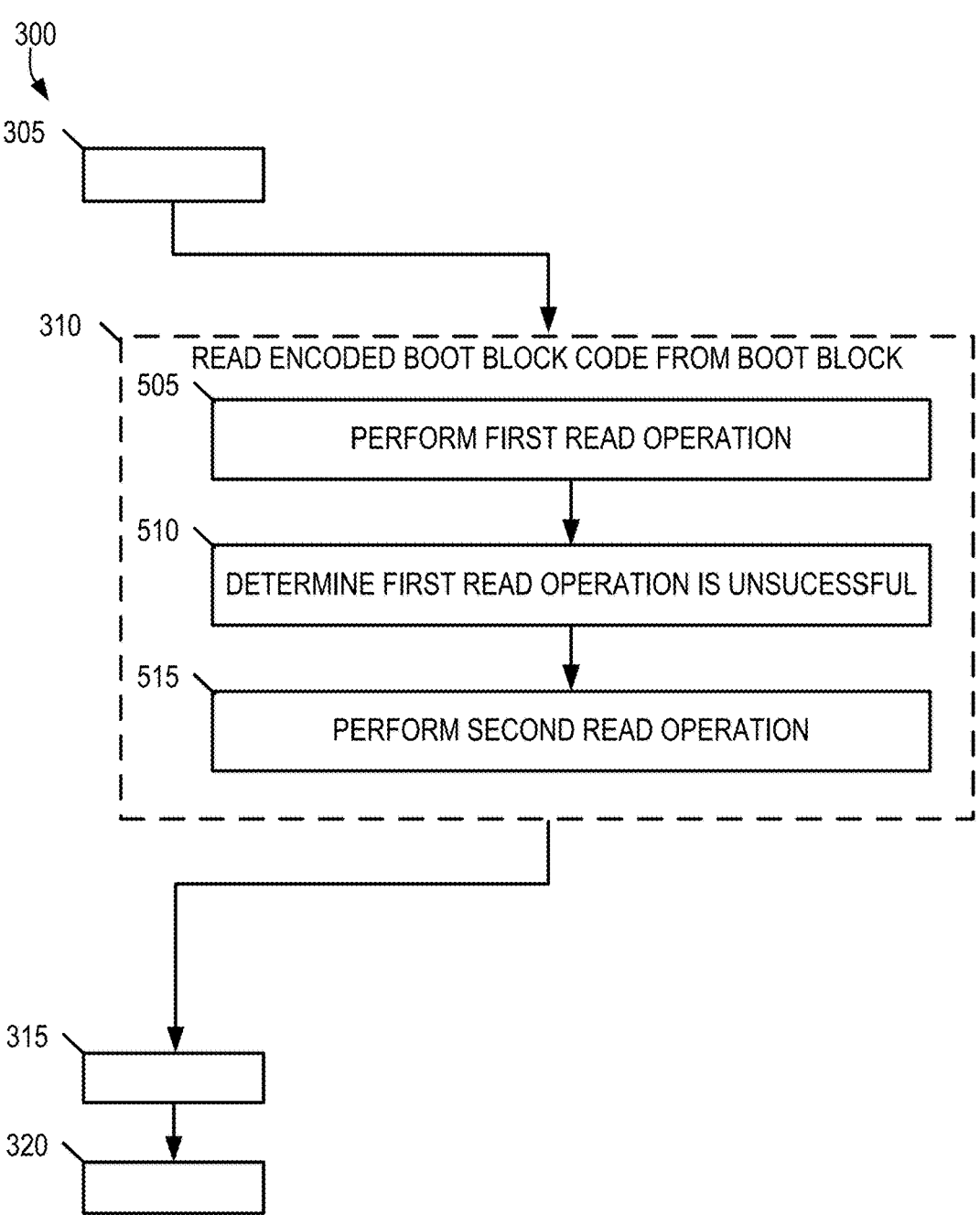

As shown in FIG. 5, the method 300 may, in some embodiments, include operations 505, 510, and 515. Consistent with these embodiments, any one of the operations 505, 510, and 515 can be performed prior to or as part of the operation 310 where the processing device reads the encoded boot block code from the boot block. At operation 505, the processing device performs a first read operation at the boot block to attempt to read the boot block code responsive to the request. The processing device performs the first read operation based on a first set of read parameters. For example, in performing the first read operation, the processing device uses a first set of read levels.

The processing device, at operation 510, determines the first read operation is unsuccessful. For example, the processing device can determine that the data read during the first operation includes uncorrectable ECC errors or is otherwise corrupt. In doing so, the processing device may count the number of programmed bits or compare multiple copies of the data to determine validity.

At operation 515, the processing device performs a second read operation based on the first read operation being unsuccessful. In performing the second read operation, the processing device uses a second set of read parameters based on one or more adjustments to the first set of read parameters. For example, the processing device may increase the read levels used in the second read operation. That is, the processing device may use a second set of read levels in performing the second read operation where the second set of read levels is greater than the first set of read levels. The second read operation can result in the boot block code being read from the boot block.

Figure 6:
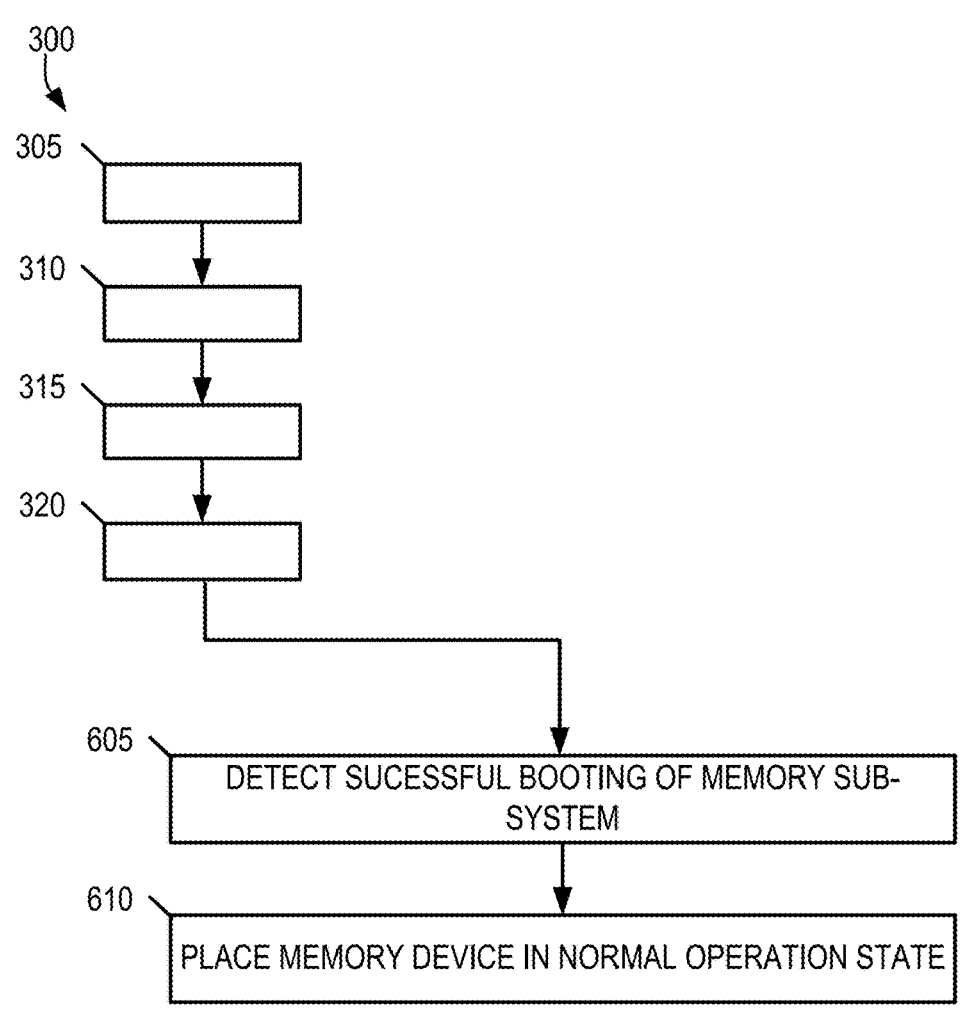

As shown in FIG. 6, the method 300 may, in some embodiments, include operations 605 and 610. Consistent with these embodiments, the operations 605 and 610 can be performed subsequent to operation 320. At operation 605, the processing device detects successful booting of the memory sub-system. In some examples, the processing device detects the successful booting of the memory sub-system based on detecting an adjustment to one or more settings of the memory sub-system. For example, one or more settings of the memory device may be modified to default or expected settings as part of proper booting of the memory sub-system.

In some examples, the processing device detects the successful booting of the memory sub-system based on detecting a change to its bus speed. For example, the processing device may detect a change to an ONFI utilized by the memory device to communicate with other components of the memory sub-system.

In some examples, the processing device detects the successful booting of the memory sub-system based on a command or other information received from a controller of the memory sub-system. For example, the controller may issue a command to the processing device that indicates successful booting of the memory sub-system.

In some examples, the processing device detects the successful booting of the memory sub-system based on one or more operations performed by one or more components of the memory sub-system.

At operation 610, the processing device places the memory device in a normal operation state in response to detecting the successful booting of the memory sub-system. That is, the processing device causes the memory device to transition from the boot state to the normal operation state. In doing so, the processing device may disable one or more functions performed while the memory device is in the boot state, which may include adjusting one or more operational parameters in accordance with normal operation. For example, while in the normal operation state, encoding and decoding of data may be performed by other downstream or upstream components other than the processing device (e.g., a memory sub-system controller or component thereof). As another example, in embodiments in which modified read levels are used to read data from the boot block, the processing device may return the read levels to default read levels.

In view of the disclosure above, various examples are set forth below. It should be noted that one or more features of an example, taken in isolation or combination, should be considered within the disclosure of this application.

Example 1. A memory sub-system comprising: a memory device comprising a boot block storing encoded boot block code, the boot block code comprising a set of machine-readable instructions for booting one or more components of the memory sub-system; and a processing device operatively coupled with the memory device, configured to perform operations comprising: receiving, while the memory device is in a boot state, a read command directed at the boot block; reading the encoded boot block code from the boot block based on the read command; decoding the encoded boot block code; and providing decoded boot block code responsive to the read command.

Example 2. The memory sub-system of Example 1, further comprising an application specific integrated circuit (ASIC), wherein the ASIC provides the read command to the processing device, wherein the processing device provides the decoded boot block code to the ASIC responsive to the read command, wherein the ASIC provides the decoded boot block code to a memory sub-system controller for use in booting the one or more components of the memory sub-system.

Example 3. The memory sub-system of any one or more of Examples 1 or 2, wherein: the read command specifies an address corresponding to a read location; the processing device is further to determine the read location based on the address; and the processing device reads the encoded boot block code from the read location.

Example 4. The memory sub-system of any one or more of Examples 1-3, wherein the processing device determines the read location based on a stored page map comprising a mapping between addresses and pages in the boot block.

Example 5. The memory sub-system of any one or more of Examples 1-4, wherein the processing device determines the read location from the address based on a predefined page offset.

Example 6. The memory sub-system of any one or more of Examples 1-5, wherein the reading of the encoded boot block code from the boot block comprises: performing a first read operation at a read location in the boot block; determining the first read operation is unsuccessful; and based on the first read operation being unsuccessful, performing a second read operation at a second read location in the boot block, the second read operation resulting in the encoded boot block code being read from the boot block.

Example 7. The memory sub-system of any one or more of Examples 1-6, wherein the reading of the encoded boot block code from the boot block comprises performing a read operation on the boot block using one or more modified read levels.

Example 8. The memory sub-system of any one or more of Examples 1-7, wherein the processing device is further to place the memory device in a normal operation state based on detecting successful booting of the memory sub-system.

Example 9. The memory sub-system of any one or more of Examples 1-8, wherein the processing device detects successful booting of the memory sub-system based on detecting an adjustment to one or more settings of the memory sub-system.

Example 10. The memory sub-system of any one or more of Examples 1-9, wherein the processing device detects successful booting of the memory sub-system based on detecting a change to bus speed.

Example 11. The memory sub-system of any one or more of Examples 1-10, wherein a host system writes the encoded boot block code to the boot block using one or more modified write levels.

Example 12. The memory sub-system of any one or more of Examples 1-11, wherein the encoded boot block code is encoded using a high reliability secondary encoding scheme.

Example 13. A method comprising: receiving, from a boot management component of a memory sub-system, a read command directed at a boot block of a memory device while the memory device is in a boot state; determining, by a local boot management component of the memory device, a read location in the boot block based on the read command; reading, by the local boot management component, encoded boot block code from the read location in the boot block based on the read command, the boot block code comprising a set of machine-readable instructions for booting one or more components of the memory sub-system; decoding, by the local boot management component, the encoded boot block code; and providing, by the local boot management component, decoded boot block code to the boot management component responsive to the read command.

Example 14. The method of Example 13, wherein: the boot management component comprises an application specific integrated circuit (ASIC); and the local boot management component corresponds to a local media controller of the memory device.

Example 15. The method of any one or more of Examples 13 or 14, wherein the determining of the read location comprises accessing a stored page map comprising a mapping between addresses and pages in the boot block.

Example 16. The method of any one or more of Examples 13-15, wherein the determining of the read location is based on a predefined page offset.

Example 17. The method of any one or more of Examples 13-16, wherein the reading of the encoded boot block code from the read location in the boot block comprises: performing a first read operation at the read location in the boot block; determining the first read operation is unsuccessful; and based on the first read operation being unsuccessful, performing a second read operation at a second read location in the boot block, the second read operation resulting in the encoded boot block code being read from the boot block.

Example 18. The method any one or more of Examples 13-17, further comprising placing the memory device in a normal operation state based on detecting successful booting of the memory sub-system, the placing of the memory device in the normal operation state comprising disabling one or more functions of the local boot management component.

Example 19. The method of any one or more of Examples 13-18, further comprising writing the encoded boot block code to the boot block using one or more modified write levels, wherein the reading of the encoded boot block code from the boot block comprises performing a read operation on the boot block using one or more modified read levels.

Example 20. A non-transitory computer-readable storage medium comprising instructions that, when executed by a processing device, configure the processing device to perform operations comprising: receiving, from a boot management component comprising an application-specific integrated circuit (ASIC), a read command directed at a boot block of a memory device while the memory device is in a boot state; determining a read location in the boot block based on the read command; reading encoded boot block code from the read location in the boot block based on the read command, the boot block code comprising a set of machine-readable instructions for booting one or more components of a memory sub-system; decoding the encoded boot block code; and providing decoded boot block code to the boot management component responsive to the read command.

Figure 7:
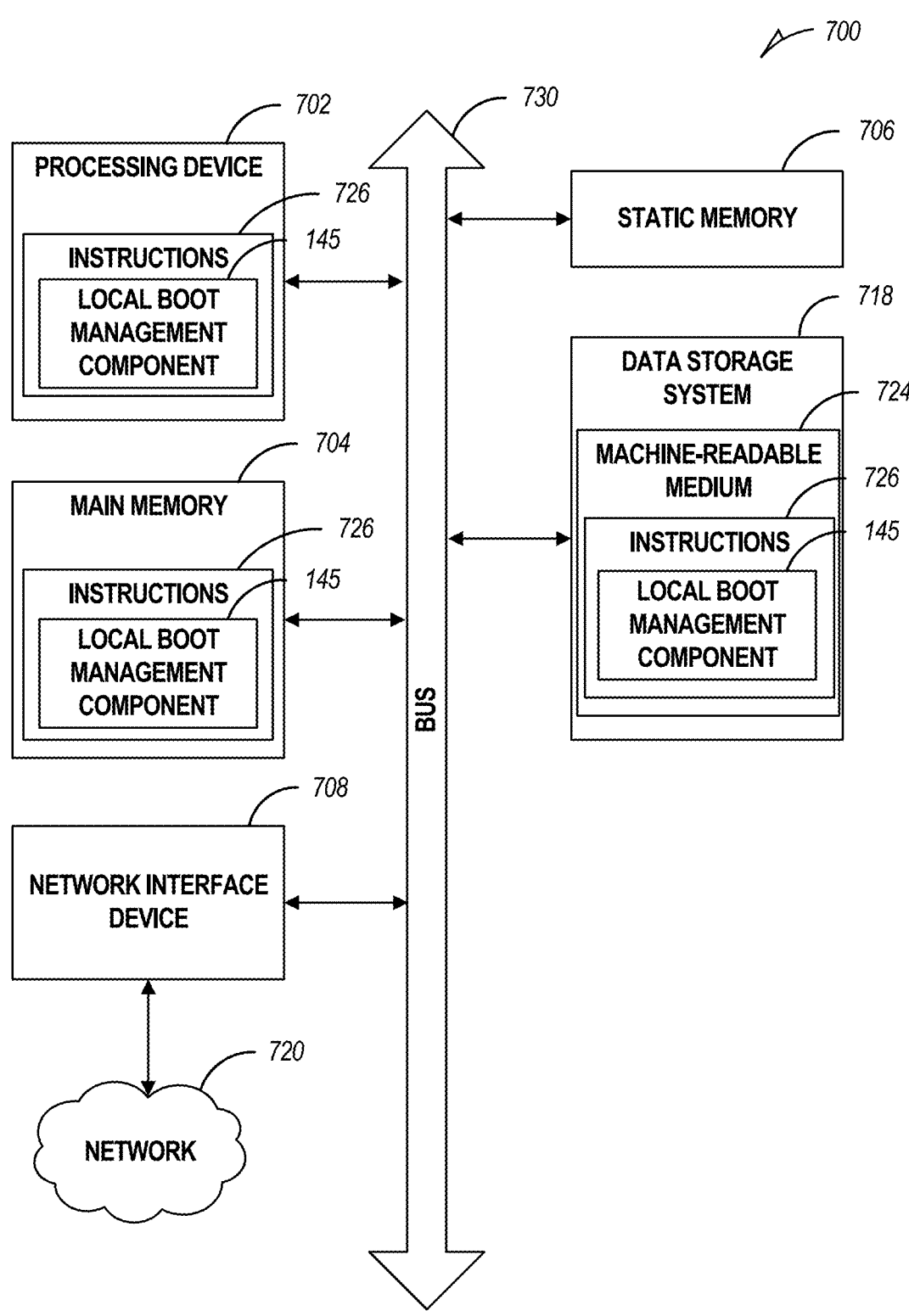
FIG. 7 is a diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the boot management component 113 or local boot management component 145 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an ASIC, a FPGA, a digital signal processor (DSP), network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a data destruction component (e.g., the local boot management component 145 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMS, EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory device comprising a boot block storing encoded boot block code, the boot block code comprising a set of machine-readable instructions for booting one or more components of the memory sub-system;
an application specific integrated circuit (ASIC) operatively coupled with the memory device; and
a processing device operatively coupled with the memory device and the ASIC, configured to perform operations comprising:
receiving, from the (ASIC), while the memory device is in a boot state, a read command directed at the boot block;
reading the encoded boot block code from the boot block based on the read command;
decoding the encoded boot block code; and
providing decoded boot block code to the ASIC responsive to the read command.

2. The memory sub-system of claim 1, wherein the ASIC provides the decoded boot block code to a memory sub-system controller for use in booting the one or more components of the memory sub-system.

3. The memory sub-system of claim 1, wherein:
the read command specifies an address corresponding to a read location;
the processing device is further to determine the read location based on the address; and
the processing device reads the encoded boot block code from the read location.

4. The memory sub-system of claim 3, wherein the processing device determines the read location based on a stored page map comprising a mapping between addresses and pages in the boot block.

5. The memory sub-system of claim 3, wherein the processing device determines the read location from the address based on a predefined page offset.

6. The memory sub-system of claim 1, wherein the reading of the encoded boot block code from the boot block comprises:
performing a first read operation at a read location in the boot block;

determining the first read operation is unsuccessful; and
based on the first read operation being unsuccessful, performing a second read operation at a second read location in the boot block, the second read operation resulting in the encoded boot block code being read from the boot block.

7. The memory sub-system of claim 1, wherein the reading of the encoded boot block code from the boot block comprises performing a read operation on the boot block using one or more modified read levels.

8. The memory sub-system of claim 1, wherein the processing device is further to place the memory device in a normal operation state based on detecting successful booting of the memory sub-system.

9. The memory sub-system of claim 8, wherein the processing device detects successful booting of the memory sub-system based on detecting an adjustment to one or more settings of the memory sub-system.

10. The memory sub-system of claim 7, wherein the processing device detects successful booting of the memory sub-system based on detecting a change to bus speed.

11. The memory sub-system of claim 1, wherein a host system writes the encoded boot block code to the boot block using one or more modified write levels.

12. The memory sub-system of claim 1, wherein the encoded boot block code is encoded using a high reliability secondary encoding scheme.

13. A method comprising:
receiving, from a boot management component of a memory sub-system, a read command directed at a boot block of a memory device while the memory device is in a boot state, the boot management component comprising an application specific integrated circuit;
determining, by a local boot management component of the memory device, a read location in the boot block based on the read command, the local boot management component corresponding to a local media controller of the memory device;
reading, by the local boot management component, encoded boot block code from the read location in the boot block based on the read command, the boot block code comprising a set of machine-readable instructions for booting one or more components of the memory sub-system;
decoding, by the local boot management component, the encoded boot block code; and
providing, by the local boot management component, decoded boot block code to the boot management component responsive to the read command.

14. The method of claim 13, wherein the determining of the read location comprises accessing a stored page map comprising a mapping between addresses and pages in the boot block.

15. The method of claim 13, wherein the determining of the read location is based on a predefined page offset.

16. The method of claim 13, wherein the reading of the encoded boot block code from the read location in the boot block comprises:
performing a first read operation at the read location in the boot block;
determining the first read operation is unsuccessful; and
based on the first read operation being unsuccessful, performing a second read operation at a second read location in the boot block, the second read operation resulting in the encoded boot block code being read from the boot block.

17. The method of claim 13, further comprising placing the memory device in a normal operation state based on detecting successful booting of the memory sub-system, the placing of the memory device in the normal operation state comprising disabling one or more functions of the local boot management component.

18. The method of claim 13, further comprising writing the encoded boot block code to the boot block using one or more modified write levels, wherein the reading of the encoded boot block code from the boot block comprises performing a read operation on the boot block using one or more modified read levels.

19. A non-transitory computer-readable storage medium comprising instructions that, when executed by a processing device, configure the processing device to perform operations comprising:

receiving, from a boot management component comprising an application-specific integrated circuit (ASIC), a read command directed at a boot block of a memory device while the memory device is in a boot state;

determining a read location in the boot block based on the read command;

reading encoded boot block code from the read location in the boot block based on the read command, the boot block code comprising a set of machine-readable instructions for booting one or more components of a memory sub-system;

decoding the encoded boot block code; and providing decoded boot block code to the boot management component responsive to the read command.

20. The non-transitory computer-readable storage medium of claim 19, wherein the operations further comprise placing the memory device in a normal operation state based on detecting successful booting of the memory sub-system based on detecting an adjustment to one or more settings of the memory sub-system.

* * * * *